US008165925B2

(12) United States Patent
Vailaya et al.

(10) Patent No.: US 8,165,925 B2
(45) Date of Patent: Apr. 24, 2012

(54) METHODS, SYSTEMS, AND PROGRAM PRODUCTS FOR GENERATING MULTIDIMENSIONAL COMPARISONS

(75) Inventors: Aditya Vailaya, San Jose, CA (US); Jiang Wu, Union City, CA (US); Vipin Jain, Santa Clara, CA (US); Peter S. S. Wang, Cupertino, CA (US); Robert Lincoln Lewis, Jr., Los Gatos, CA (US)

(73) Assignee: Retrevo Inc., Sunnyvale, CA (US)

( * ) Notice: Subject to any disclaimer, the term of this patent is extended or adjusted under 35 U.S.C. 154(b) by 814 days.

(21) Appl. No.: 12/062,393

(22) Filed: Apr. 3, 2008

(65) Prior Publication Data
US 2009/0254452 A1 Oct. 8, 2009

(51) Int. Cl.
*G06Q 30/00* (2012.01)

(52) U.S. Cl. .......... 705/26.64; 705/26.1; 705/26.62; 705/26.63; 705/27.1

(58) Field of Classification Search .......... 705/26–27, 705/26.1–27.2
See application file for complete search history.

(56) References Cited

U.S. PATENT DOCUMENTS

| | | | | |
|---|---|---|---|---|
| 5,576,951 | A | 11/1996 | Lockwood | 395/227 |
| 5,970,471 | A | 10/1999 | Hill | 705/26 |
| 6,167,383 | A * | 12/2000 | Henson | 705/26 |
| 7,006,990 | B2 | 2/2006 | Stolze et al. | 705/27 |
| 7,047,211 | B1 * | 5/2006 | Van Etten et al. | 705/26 |
| 7,117,163 | B1 | 10/2006 | Iyer et al. | 705/10 |
| 7,158,943 | B2 | 1/2007 | Van der Riet | 705/14 |
| 7,197,475 | B1 * | 3/2007 | Lorenzen et al. | 705/26 |
| 7,197,479 | B1 | 3/2007 | Franciscus de Heer et al. | 705/27 |
| 7,246,087 | B1 | 7/2007 | Ruppelt et al. | 705/27 |
| 7,644,015 | B2 * | 1/2010 | Van Etten et al. | 705/27 |
| 7,720,719 | B2 * | 5/2010 | Mallya et al. | 705/26 |
| 2001/0011236 | A1 * | 8/2001 | Shell | 705/26 |
| 2002/0026386 | A1 | 2/2002 | Walden | 705/27 |
| 2002/0065721 | A1 | 5/2002 | Lema et al. | 705/14 |
| 2002/0072993 | A1 | 6/2002 | Sandus et al. | 705/26 |
| 2002/0184104 | A1 | 12/2002 | Littman | 705/26 |
| 2004/0006509 | A1 | 1/2004 | Mannik et al. | 705/14 |
| 2004/0122731 | A1 | 6/2004 | Mannik et al. | 705/14 |
| 2005/0160004 | A1 | 7/2005 | Moss et al. | 705/14 |
| 2006/0136305 | A1 | 6/2006 | Fitzsimmons et al. | 705/26 |
| 2006/0178950 | A1 * | 8/2006 | Van Etten et al. | 705/26 |

(Continued)

OTHER PUBLICATIONS

Beyond Text-Search: New System for Online Product Catalogs Enables Precise, Rapid Search, Comparison & Selection Via Product Attributes PR Newswire , p. 506SJM006 May 6, 1996.*

(Continued)

*Primary Examiner* — William Allen
(74) *Attorney, Agent, or Firm* — Zilka-Kotab, PC

(57) ABSTRACT

A method for performing an action based on user interaction with a graphical presentation, according to one embodiment. In use, output data is generated corresponding to a multidimensional presentation of graphical representations of two or more consumer products in relation to each other. Additionally, positions of the graphical representations of the consumer products relative to each other are based on multiple attributes of the products. Further, none of the dimensions correlates to a side by side ordering of the consumer products. Further still, a user selection of one or more of the consumer products is received. Also, a transaction is performed based on additional input received from the user. Additional embodiments are also presented.

28 Claims, 13 Drawing Sheets

U.S. PATENT DOCUMENTS

| | | | |
|---|---|---|---|
| 2006/0282339 A1 | 12/2006 | Musgrove et al. | 705/27 |
| 2007/0174115 A1 | 7/2007 | Chieu et al. | 705/14 |
| 2007/0226082 A1 | 9/2007 | Leal | 705/27 |
| 2007/0260521 A1 | 11/2007 | Van Der Riet | 705/14 |
| 2008/0004979 A1* | 1/2008 | Malsbenden | 705/26 |
| 2008/0109232 A1* | 5/2008 | Musgrove et al. | 705/1 |
| 2008/0114644 A1* | 5/2008 | Frank et al. | 705/14 |
| 2008/0160147 A1* | 7/2008 | Tormey | 426/383 |
| 2008/0235076 A1* | 9/2008 | Cereghini et al. | 705/10 |
| 2009/0043674 A1* | 2/2009 | Minsky et al. | 705/27 |
| 2009/0083164 A1* | 3/2009 | Hull et al. | 705/27 |

OTHER PUBLICATIONS

"NexTag Comparison Shopping" http://www.nextag.com/.

"Reseller Ratings Comparison" http://www.resellerratings.com/.

"Best Buy Compare Products" http://bestbuy.com/.

"Yahoo Shopping" http://help.yahoo.com/l/us/yahoo/shopping/saved/shop-130.html.

"Module 7. How do I compare two or more products side-by-side?" http://www.ebuy.psu.edu/modules/module07.shtml.

"Compare Products Side-By-Side" http://oscommerce.com/community/contributions,2192.

* cited by examiner

METHODS, SYSTEMS, AND PROGRAM PRODUCTS FOR GENERATING MULTIDIMENSIONAL COMPARISONS

FIELD OF THE INVENTION

The present invention relates to displaying information, and more particularly to performing an action based on user interaction with the information.

BACKGROUND

Many times, today's product information presentations fall into two categories: simple and detailed. In the simple category, a user is typically given a product image, short description, and price. In the detailed category, the user is often given a lot of reviews, specs, and discussions to read. However, the simple information is not enough to give the user a sense as to what the product is about. Various services have started adding other summarized information to address this. For example, numerical ratings from experts or users are added to the simple information. While these address the issues of user opinion, they do not provide a way to display product facts in the simple presentation. Additionally, no way exists to interact with the displayed product facts and perform actions based on the interaction.

There is thus a need for addressing these and/or other issues associated with the prior art.

SUMMARY

A method is provided for performing an action based on user interaction with a graphical presentation. In use, output data corresponding to a multidimensional graphical presentation of at least two dimensions is generated, where each dimension represents values of attributes of products. Additionally, no dimension is a side by side ordering of the products. Further, a representation of each of one or more products is placed in the graphical presentation independently according to attribute values of the one or more products. Further still, a user selection of one or more of the products is received. Also, output data corresponding to additional information is generated for presentment to the user based on the selection of the one or more of the products. In addition, additional input is received from the user corresponding to user-selection of a portion of the additional information. Furthermore, a transaction is performed based on the additional input received from the user.

In addition, a method is provided for performing an action based on user interaction with a graphical presentation, in accordance with another embodiment. In use, output data is generated corresponding to a multidimensional presentation of graphical representations of two or more consumer products in relation to each other. Additionally, positions of the graphical representations of the consumer products relative to each other are based on multiple attributes of the products. Further, none of the dimensions correlates to a side by side ordering of the consumer products. Further still, a user selection of one or more of the consumer products is received. Also, a transaction is performed based on additional input received from the user.

Further, a method is provided for performing an action based on user interaction with a graphical presentation, in accordance with yet another embodiment. In use, output data corresponding to a multidimensional graphical presentation of at least two dimensions is generated, where each dimension represents values of attributes of products. Additionally, no dimension is a side by side ordering of the products. Further, a representation of each of one or more groups of products is placed in the graphical presentation independently according to attribute values of the products in the one or more groups. Further still, a user selection of one or more of the product groups is received. Also, a transaction is performed based on additional input received from the user.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
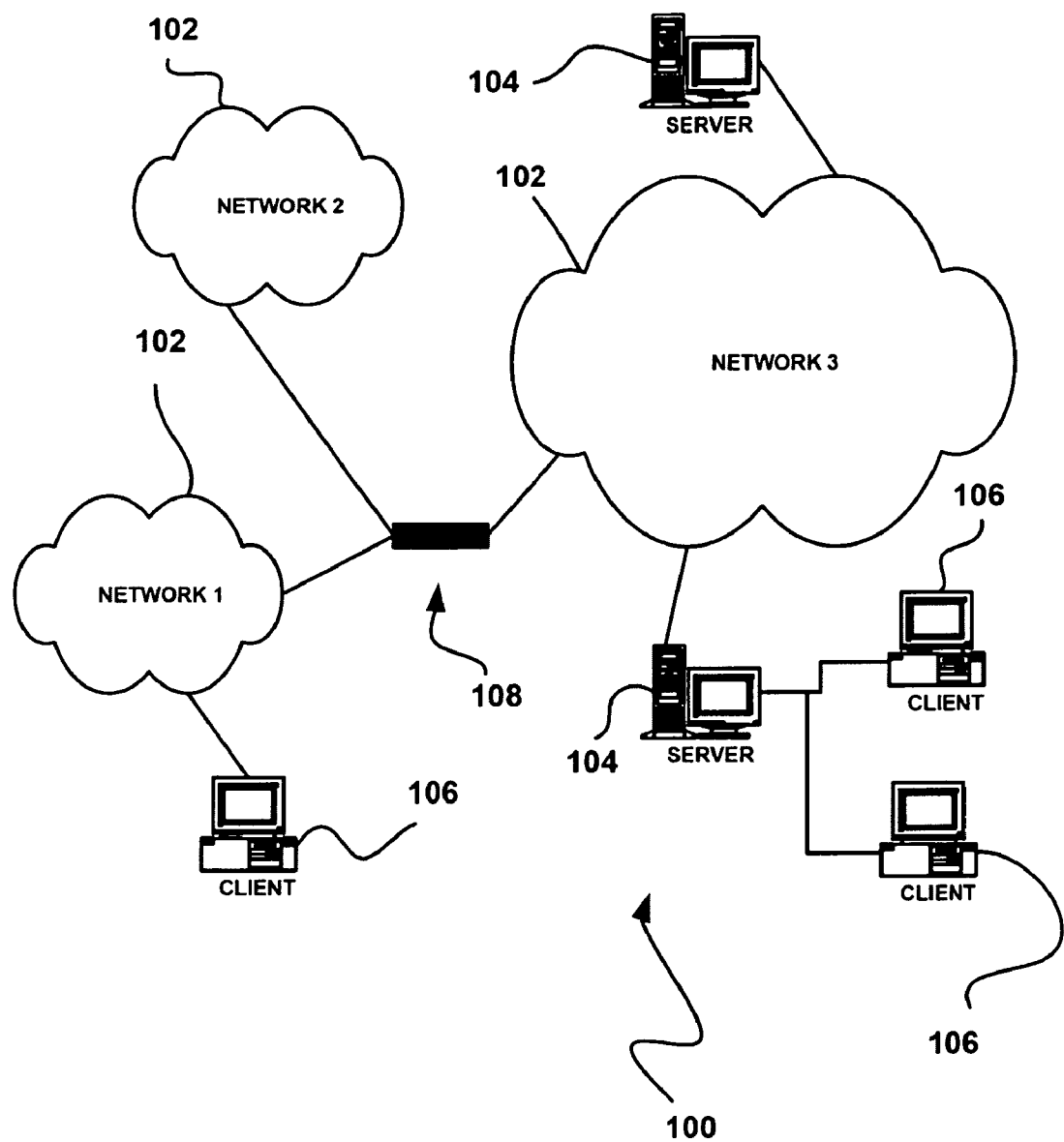
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
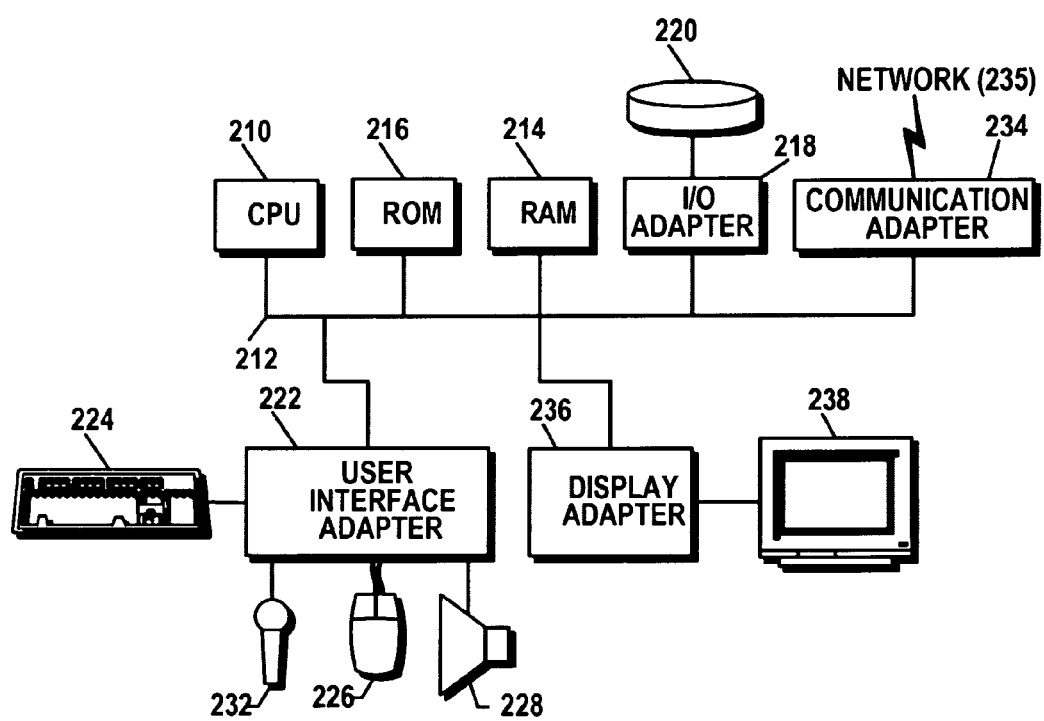
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
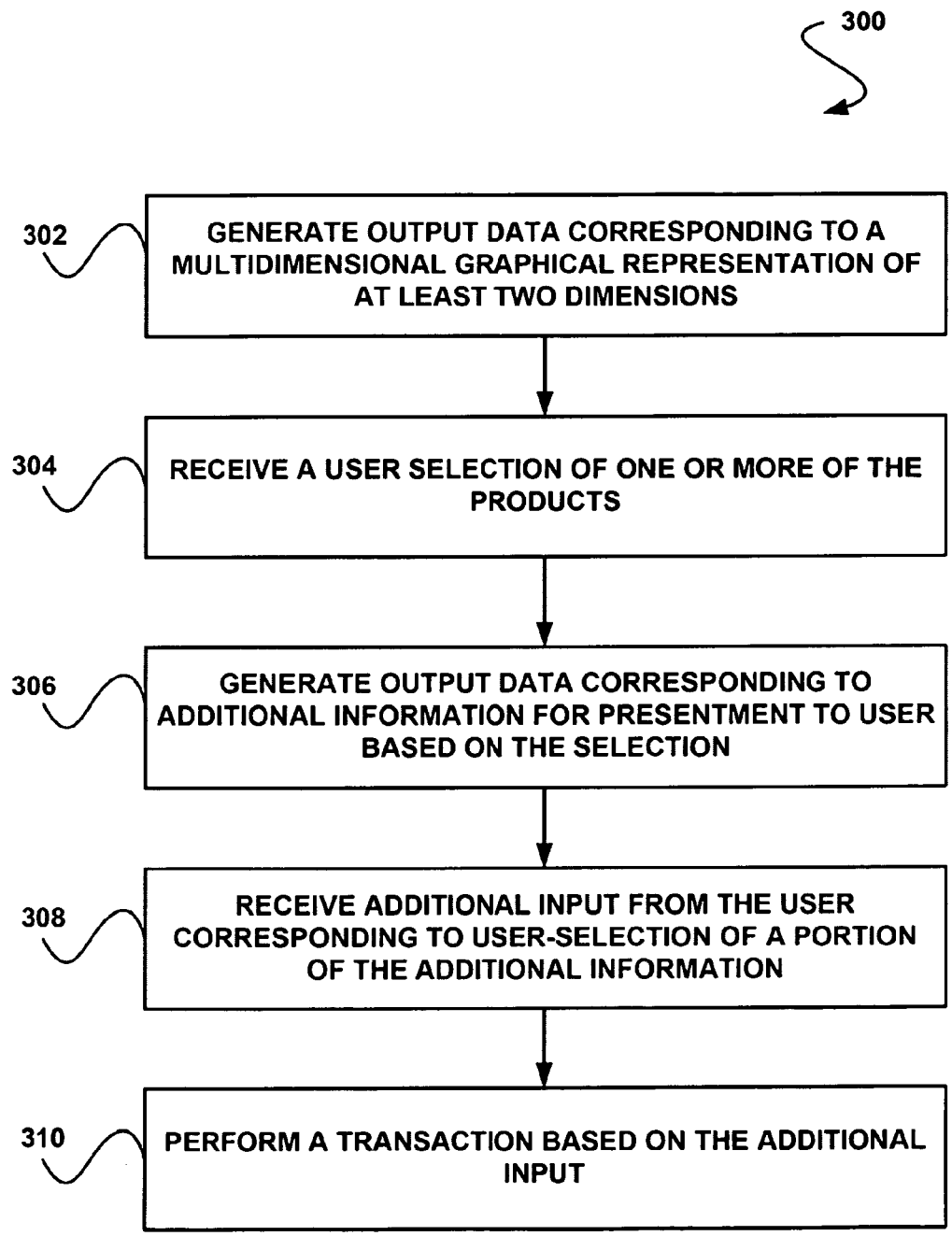
FIG. 3 shows a method for performing an action based on user interaction with a graphical presentation, in accordance with one embodiment.

FIG. 3 shows a method 300 for performing an action based on user interaction with a graphical presentation, in accordance with one embodiment. As an option, the method 300 may be carried out in the context of the architecture and environment of FIGS. 1 and/or 2. Of course, however, the method 300 may be carried out in any desired environment.

As shown in operation 302, output data corresponding to a multidimensional graphical presentation of at least two dimensions is generated, where each dimension represents values of attributes of products. Additionally, no dimension is a side by side ordering of the products.

Further, a representation of each of one or more products is placed in the graphical presentation independently according to attribute values of the one or more products. Further still, in operation 304 a user selection of one or more of the products is received.

Also, in operation 306 output data corresponding to additional information is generated for presentment to the user based on the selection of the one or more of the products. In addition, in operation 308 additional input is received from the user corresponding to user-selection of a portion of the additional information. Furthermore, in operation 310 a transaction is performed based on the additional input received from the user.

Figure 4:
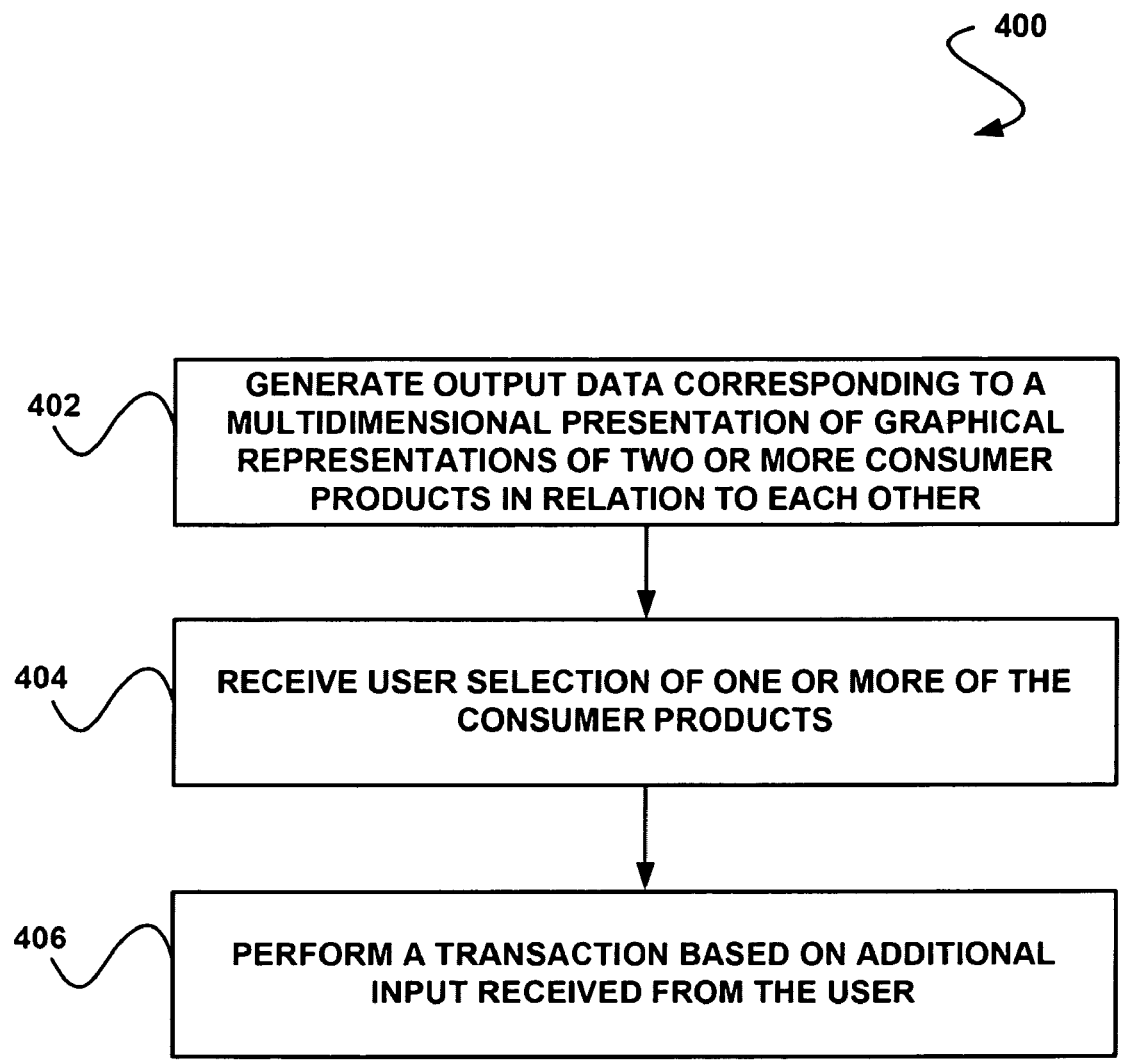
FIG. 4 shows a method for performing an action based on user interaction with a graphical presentation, in accordance with another embodiment.

FIG. 4 shows a method 400 for performing an action based on user interaction with a graphical presentation, in accordance with another embodiment. As an option, the method 400 may be carried out in the context of the architecture and environment of FIGS. 1-3. Of course, however, the method 400 may be carried out in any desired environment.

As shown in operation 402, output data is generated corresponding to a multidimensional presentation of graphical representations of two or more consumer products in relation to each other. Additionally, positions of the graphical representations of the consumer products relative to each other are based on multiple attributes of the products. Further, none of the dimensions correlates to a side by side ordering of the consumer products.

Further still, in operation 404, a user selection of one or more of the consumer products is received. Also, in operation 406, a transaction is performed based on additional input received from the user.

Figure 5:
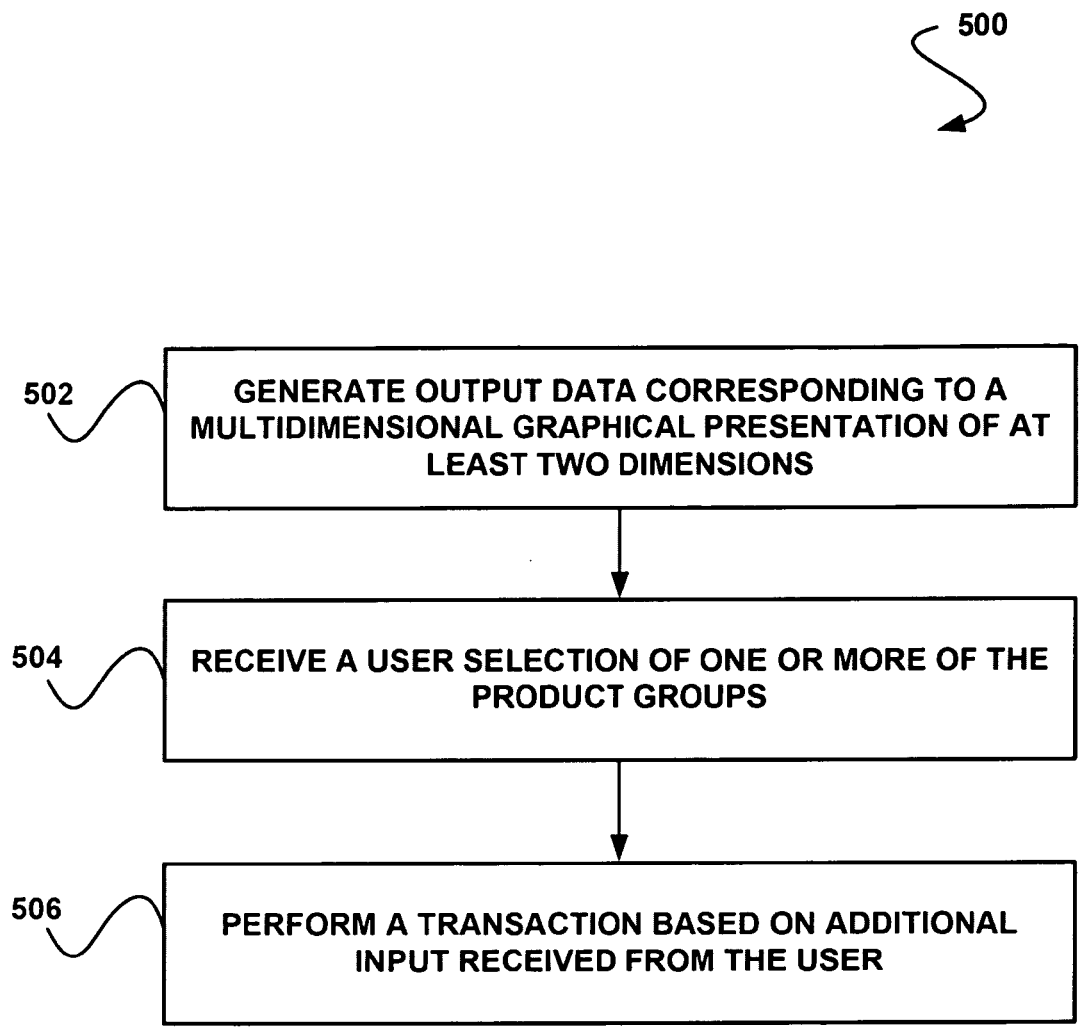
FIG. 5 shows a method for performing an action based on user interaction with a graphical presentation, in accordance with yet another embodiment.

FIG. 5 shows a method 500 for performing an action based on user interaction with a graphical presentation, in accordance with yet another embodiment. As an option, the method 500 may be carried out in the context of the architecture and environment of FIGS. 1-5. Of course, however, the method 500 may be carried out in any desired environment.

As shown in operation 502, output data corresponding to a multidimensional graphical presentation of at least two dimensions is generated, where each dimension represents values of attributes of products. Additionally, no dimension is a side by side ordering of the products. Further, a representation of each of one or more groups of products is placed in the graphical presentation independently according to attribute values of the products in the one or more groups.

Further still, in operation 504, a user selection of one or more of the product groups is received. Also, in operation 506, a transaction is performed based on additional input received from the user.

Graphical Presentation

In the context of the present description, the attributes of the products may include anything associated with the products that enable the products to be differentiated from other products. In one embodiment, the attributes may relate to cost. For example, the attributes may include one or more prices of the products, the product price history, etc. In another embodiment, the attributes may include one or more features of the products. In yet another embodiment, the attributes may include one or more manufacturers of the products. In still another embodiment, the attributes may include one or more brands associated with the products. In yet another embodiment, the attributes may include additional add-ons such as software, consumables, and accessories associated with the products.

Additionally, in another embodiment, the attributes may involve the sale of the product. For example, the attributes may include a seller or sellers of the products. In yet another embodiment, the attributes may include a quantitative representation of user interest in the products. In yet another embodiment, the attributes may include a quantitative representation of non-user interest in the products. For example, the attributes may include the amount of "market buzz" surrounding the products from media, publishers, manufacturers, influencers, other professionals.

In still another embodiment, the attributes may include a cost element relating to the products. For example, the attributes may include a cost of ownership of the products. In yet another embodiment, the attributes may include an environmental and/or energy related element of the products. For example, the attributes may include a green index of the products, an energy index of the products, etc.

Furthermore, in one embodiment, the attributes may include a rating of the products. These ratings can be based on users or experts. In yet another embodiment, the attributes may include a popularity of the products. For example, the popularity may be based on any quantitative or qualitative criteria. In another embodiment, the attributes may include a rating of the fashionability of the product. For example, the attributes may include a fashion/style index of the product. In yet another embodiment, the attributes may include a time-related element of the products. For example, the attributes may include a recency index. in another example, the attributes may include an obsolescence index.

Further still, in another embodiment, the attributes may include an indication of the reliability of the products. For example, the attributes may include a reliability index, etc. In yet another embodiment, the attributes may include one or more services associated with products. For example, a product such as an appliance may have a required installation associated with it, a product such as a television satellite receiver or cellular phone may have a service subscription fee associated with it, etc. In yet another embodiment, the attributes may include one or more support services, such as but not limited to warranty, repair, maintenance associated with the products. Of course, however, each dimension may represent the values of any attributes of the products and combinations thereof and any of these attributes (in this or any other embodiment) may be collected from a local source, third party information, or internet based search.

In yet another embodiment, the attributes may include a number or percentage of additional users who are interested or not interested in the one or more products. For example, the attributes may include past selection of one or more products by the additional users. In still yet another embodiment, the attributes may include a number or percentage of additional users who are currently selling or currently interested in buying the one or more products. In this way, the user may be influenced in their decision to select the one or more products.

Figure 6:
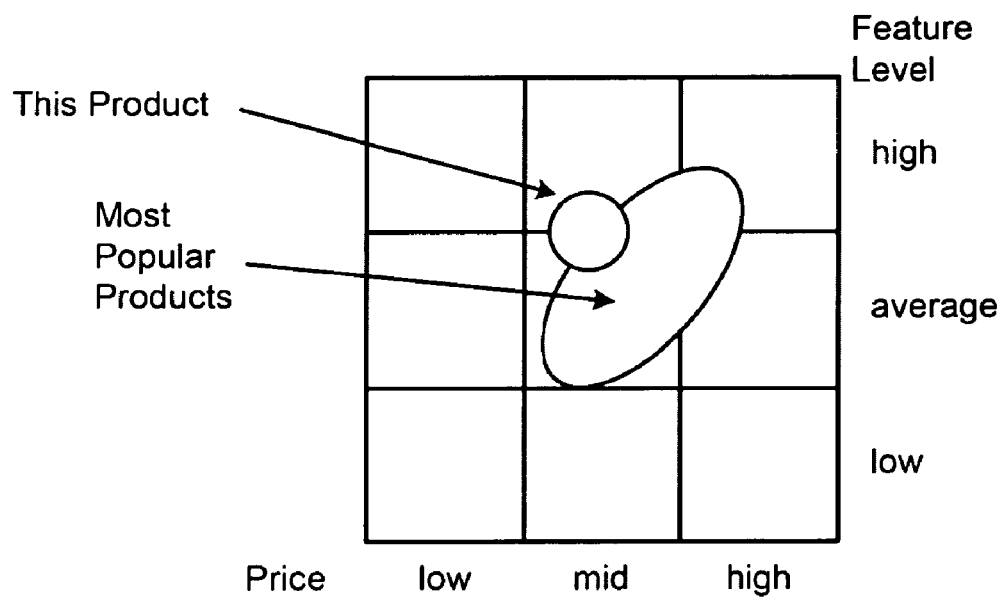
FIG. 6 illustrates an example of output data including a group of products as well as an individual product, in accordance with still another embodiment.

Also, in another embodiment, the attribute value of the groups of products may be based on a statistical value of attributes of all products in the respective group. For example, the attribute value of a particular group of products may be based on the sum of the attributes of all products in the group. An example of output data including a group of products as well as an individual product is shown in FIG. 6.

Additionally, the values of the attributes of the products may include any values capable of conveying product information. In one embodiment, the values may include a binary value. For example, the values may include whether the product contains a particular feature. In another embodiment, the values may include alphanumeric values. For example, the values may include the name of the manufacturer, distributor, retailer, etc. In yet another example, the values may include decimal values. For example, the values may include the price of the product.

In yet another embodiment, the attributes, or a derivative thereof, may be mapped against each other for each product to generate the output data corresponding to the multidimensional presentation. For example, the price of a group of products may be mapped against one or more particular features of those products, thereby generating output data that corresponds to the multidimensional presentation. In this way, the user may experience faster navigation and an enhanced shopping experience over conventional methods.

In still another embodiment, the attributes that are mapped against each other to generate the output data corresponding to the multidimensional presentation may be selected by the user. For example, the user may select a subset of attributes that the user is interested in, and this subset of attributes may be mapped against each other to generate the output data in relation to the user's selection.

Figure 7:
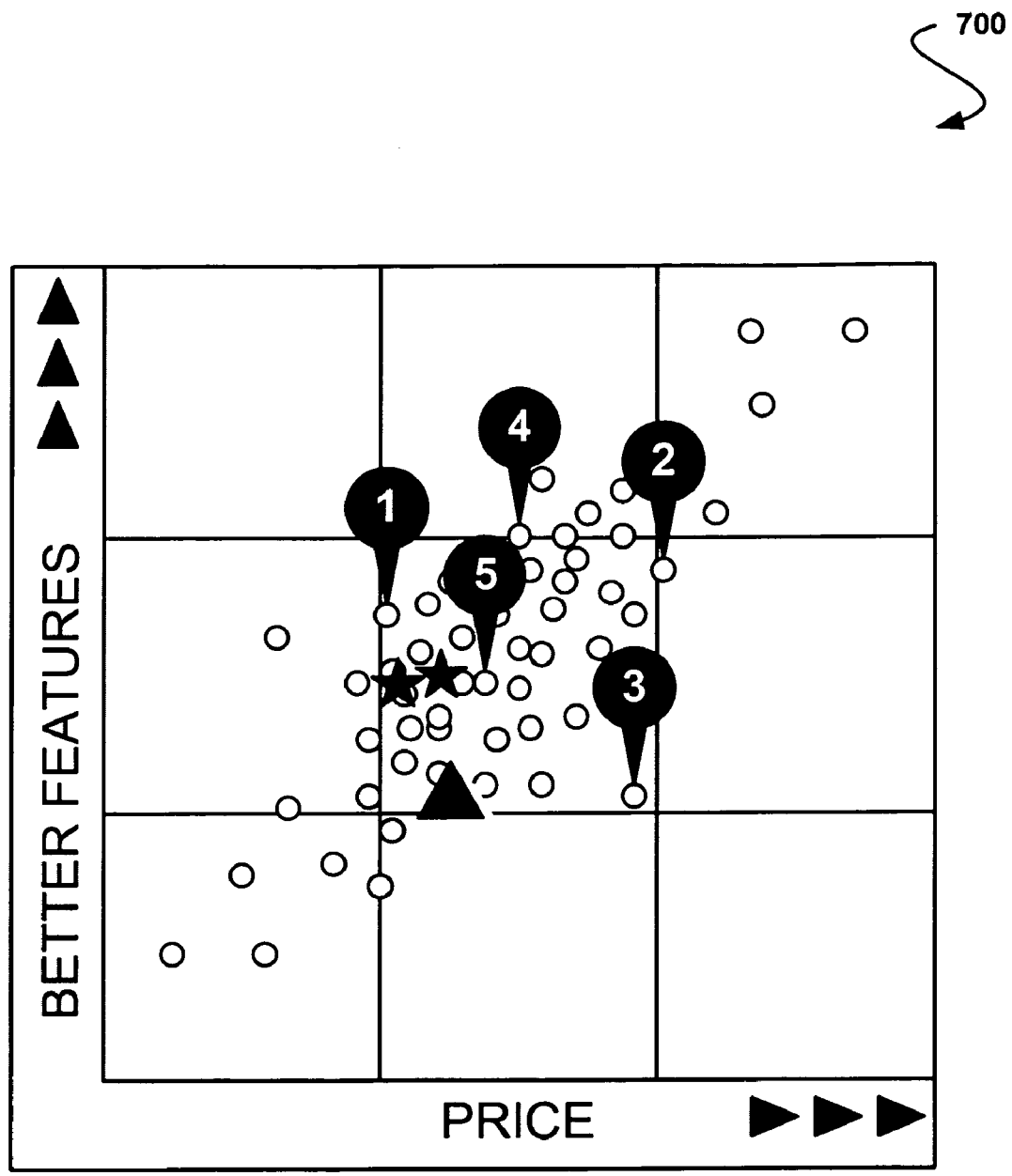
FIG. 7 shows an example of a multidimensional graphical presentation, in accordance with yet another embodiment.

In another embodiment, the representation of each of the one or more products in the multidimensional graphical presentation may include any visual indication that is capable of representing the products. For example, the representation may include text, an icon, an image, etc. One example of such representation is found in FIG. 7.

Further, the multidimensional graphical presentation may include any graphical presentation with two or more dimensions. In one embodiment, the multidimensional presentation may be two dimensional. For example, the multidimensional presentation may be based on a two dimensional Cartesian coordinate system. In another example, the multidimensional presentation may be based on a two dimensional polar coordinate system.

Additionally, in another embodiment, additional visual dimensions may be displayed on the two dimensional presentation. For example, color, shape, size, depth, text, image, icon, etc. may be displayed on the two dimensional presentation. In another example, video, animation, motion (e.g., flicker, movement, change in color/size/shape with time, etc.) may be displayed on the two dimensional presentation.

Figure 8:
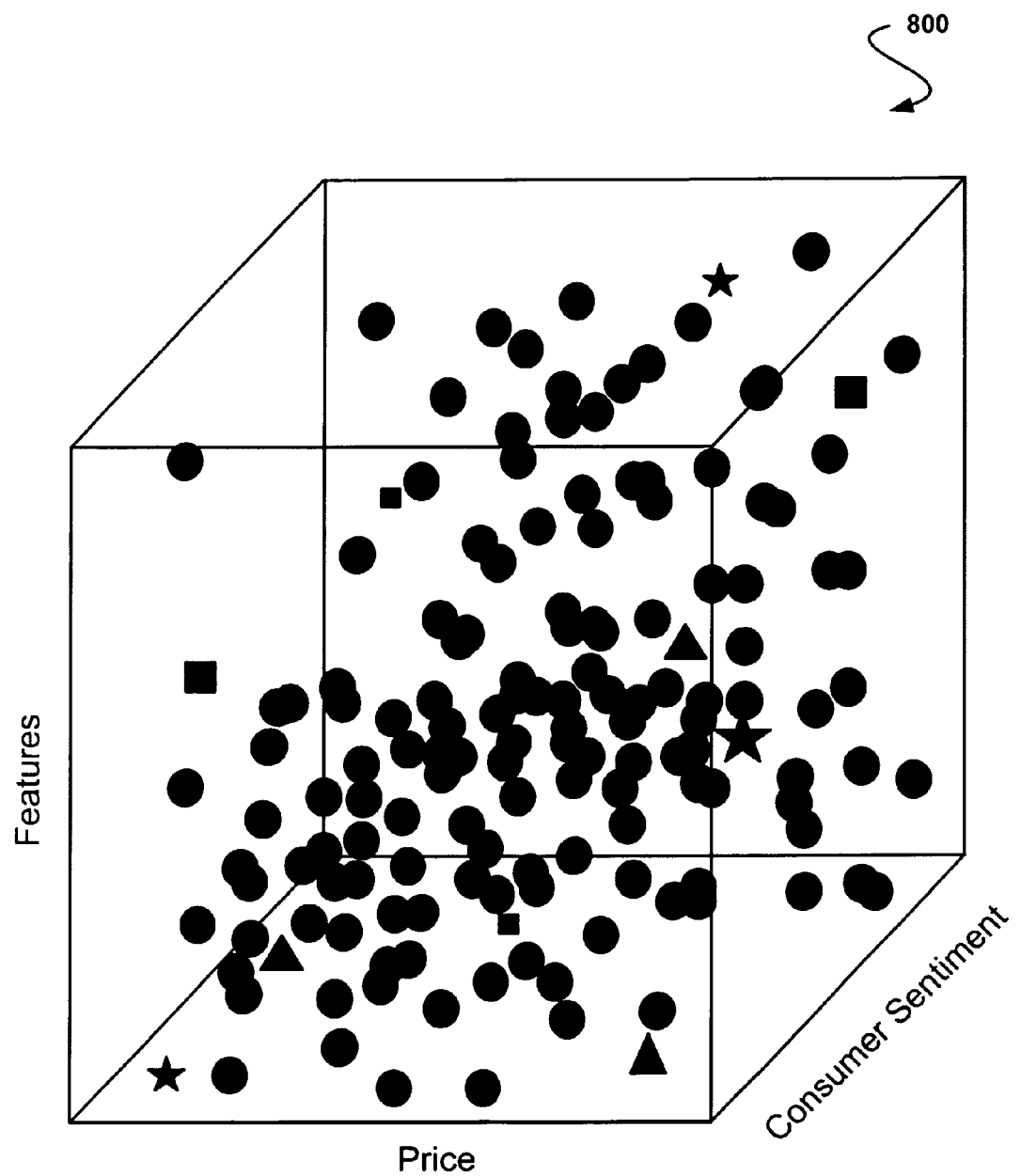
FIG. 8 shows an example of a three-dimensional representation, in accordance with still yet another embodiment.

Further, in yet another embodiment, the multidimensional presentation may be three dimensional. For example, the multidimensional presentation may be based on a three dimensional Cartesian coordinate system. In another example, the multidimensional presentation may be based on a three dimensional polar coordinate system. One example of a three-dimensional representation is shown in FIG. 8.

Further still, in another embodiment, additional visual dimensions may be displayed on the three dimensional presentation. For example, color, shape, size, depth, text, image, icon, etc. may be displayed on the three dimensional presentation. In another example, video, animation, motion (e.g., flicker, movement, change in color/size/shape with time, etc.) may be displayed on the three dimensional presentation. For example, the additional visual dimensions and/or motion may be incorporated into the representation of each of the one or more products in the multidimensional graphical presentation.

In yet another embodiment, the graphical representation of each of the one or more groups of products may include an n-dimensional shape indicative of n attributes being displayed for the group. The n-dimensional shape may include any hypershape including n dimensions. For example, the n-dimensional shape may include an n-dimensional hyper-ellipse, an n-dimensional hyper-rectangle, an n-dimensional hyper-sphere, etc. in this way, multiple attributes of the group may be displayed as a single object in the graphical representation.

Also, in one embodiment, boundaries of the graphical representation of each of the one or more groups of products may be based on aggregated attribute values of the products in the groups, such as but not limited to maximum, minimum, a certain percentile of attribute values of at least some products in the group, etc. For example, the boundaries of the graphical representation of the prices and features of the group may be based on the highest and lowest prices, and most and least features, found in the group. In another embodiment, the center position of the n-dimensional shape may be calculated based on the median or average of the attribute values of at least some products in the group.

Figure 9:
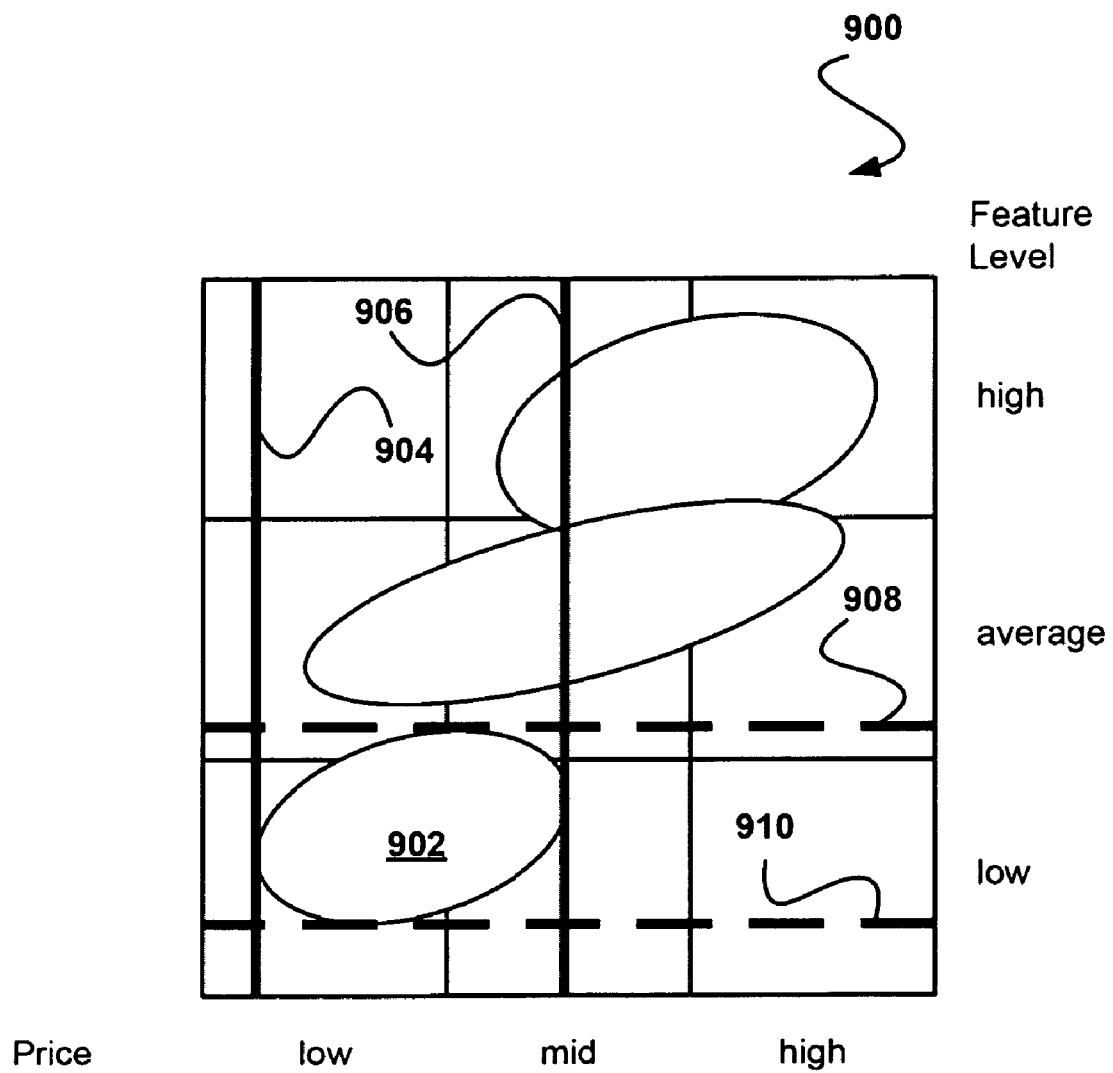
FIG. 9 shows an illustrative graphical presentation of multiple groups in a two dimensional presentation, in accordance with another embodiment.

FIG. 9 shows an illustrative graphical presentation 900 of multiple groups in a two dimensional presentation, in accordance with another embodiment. As shown, group 902 includes boundaries 904-910. Boundary 904 is based on the lowest price found in the group 902. Additionally, boundary 906 is based on the highest price found in the group 902. Further, boundary 910 is based on the lowest feature level of the group 902, whereas boundary 908 is based on the highest feature level of the group 902.

Also, in another embodiment, the multidimensional presentation may include a group of multidimensional sub-presentations, where the sub-presentations in the group have a common dimension. In yet another embodiment, the user-selection of a portion of the multidimensional presentation may result in output data that includes the group of multidimensional sub-presentations. For example, the user may click on a position of the n-dimensional shape indicating particular values for the attributes being displayed for the group, which may lead to the display of the sub-presentation of the product or group of products containing those attribute values.

In another embodiment, the sub-presentations in the group may include multiple side by side presentations, vertically stacked presentations, or presentations arranged in any manner, where one presentation displays one set of features and another presentation displays another set of features. For example, one presentation may display a cost of ownership, whereas the other presentation may display a current value map. In another example, one presentation may display the number of people interested in buying and/or selling one or more of the products.

Figure 10:
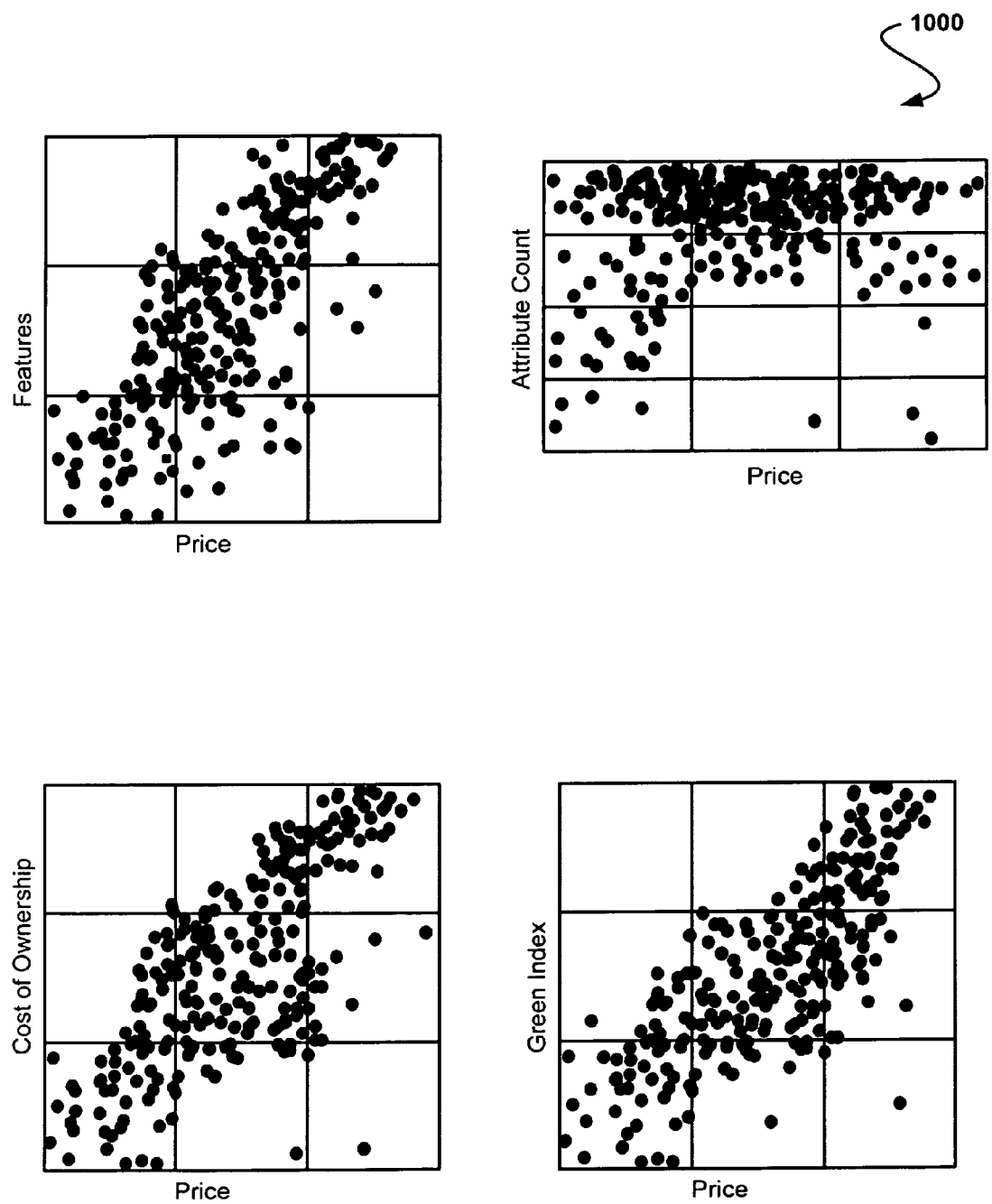
FIG. 10 shows graph synchronization, in accordance with still another embodiment.

In another embodiment, products selected on one presentation may be automatically selected in the other presentation. One example of this is shown in FIG. 10, where multiple graphs share a common X axis (representing price), and all the graphs are synchronized in that a product selected in one graph is automatically selected in another graph.

User Selection and Performing Transactions

In another embodiment, the user selection may be based on receiving user-selection of one of the representations of the products directly from the multidimensional presentation output to the user on a display. For example, the user may select one of the representations of the products by clicking on the representation with a cursor. In another example, the user may select the representation by hovering over the representation with a cursor. Of course, however, the user may select the representation in any manner.

Further, in another embodiment, the additional information may include a local page facilitating purchase of the one or more selected products. For example, the local page may be on a domain that is the same as the domain on which the multidimensional presentation is hosted. In another example, the local page may be owned by the provider of the multidimensional presentation.

In yet another embodiment, the additional information may include a third party page facilitating purchase of the one or more selected products. For example, upon receiving the user selection of one or more products, the user may be redirected to an online retailer page, a partner entity's web page, a third party retail page, a third party payment page, etc. in order to purchase the selected products.

Additionally, in another embodiment, the additional information may include access to research information relating to the selected one or more products. For example, upon receiving the user selection of one or more products, the user may be redirected to a detailed product information page, the manufacturer's web page, an online forum dedicated to the products, etc. in order to obtain more information regarding the selected products. In another example, the transaction may include retrieving the research information in response to the additional input from the user and outputting the retrieved research information.

Figure 11:
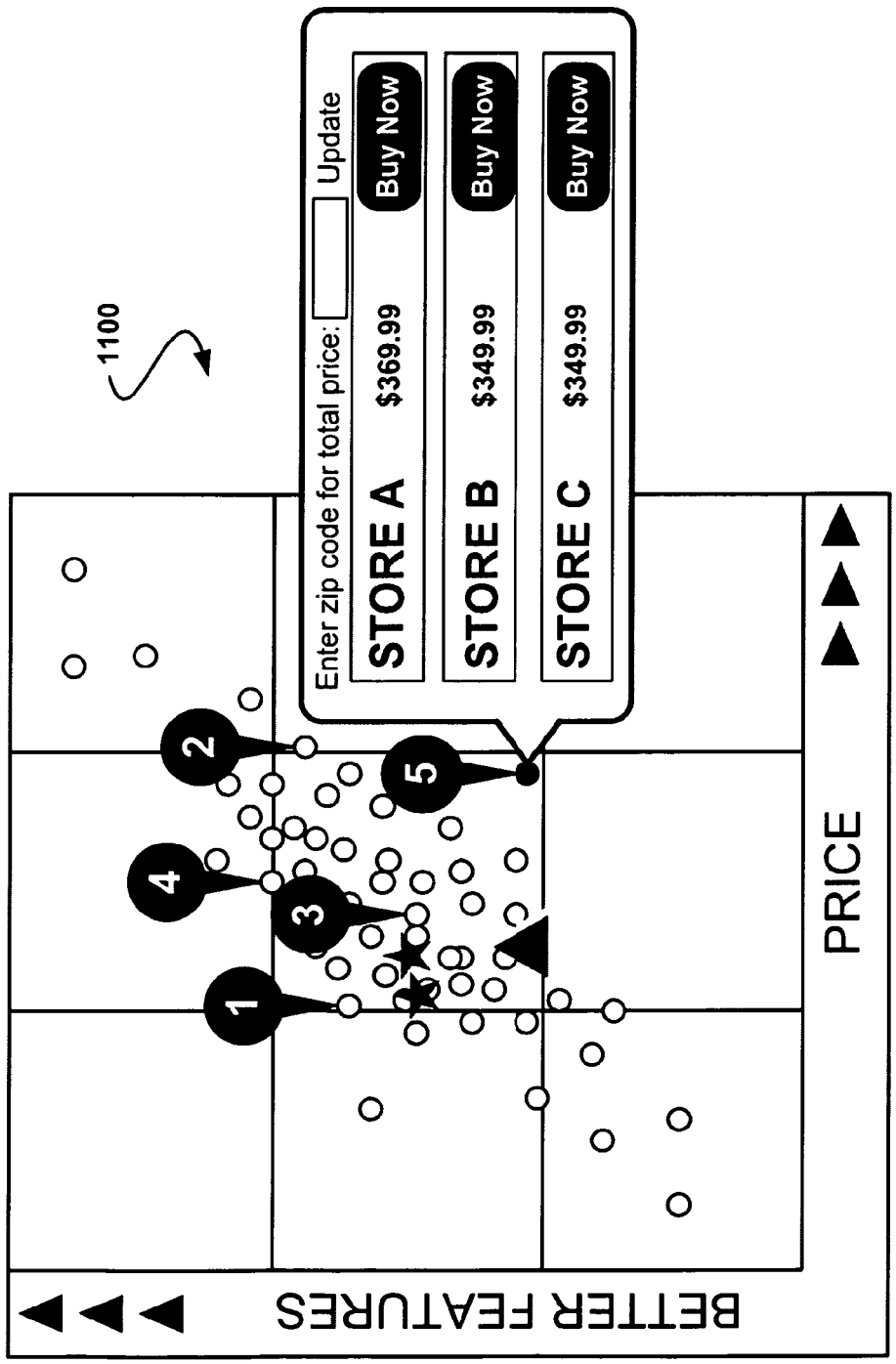
FIG. 11 shows an example where output data corresponding to additional information is presented to the user based on the selection of one or more products, in accordance with yet another embodiment.

FIG. 11 illustrates one embodiment where output data corresponding to additional information is presented to the user based on the selection of one or more products. For example, an additional visual may assist users in performing the transaction through one or more stores/vendors.

Furthermore, in one embodiment, the transaction may include a monetary transaction for purchase of the one or more selected products. For example, the user may select a purchase icon found next to the selected product in the generated output data corresponding to the additional information, and may then be taken to a monetary transaction page, where the user inputs payment information (e.g. credit card information, billing information, etc.).

In another embodiment, the user may select a purchase icon found next to the selected product in the additional information, and the monetary transaction for the selected product may be automatically processed (e.g. using stored payment information, previously entered payment information, etc.).

In yet another embodiment, the transaction may include registering the user to receive additional information about the one or more of the products. For example, the user may be added to a group that receives periodic updates about the one or more products, or additional products related to the one or more products in any manner. In another example, the user may be asked to register or may be automatically registered as a visitor with the local domain before being taken to additional information found within the domain.

In still another embodiment, the transaction may include leading the user to a promotion or campaign. For example, the user may be sent to a marketing campaign related to the selected products. In another example, the user may be enrolled and/or registered in a promotion relating to one or more of the products. In yet another example, the user may be sent to the website of the manufacturers of the selected products. In still another example, advertising for one or more of the selected products may be directed towards the user.

In still yet another embodiment, the transaction may include generating output corresponding to further information selected from expert reviews, user reviews, expert ratings, user ratings, user generated content of any form such as but not limited to text, image, video, audio, etc., product features, detailed product comparisons, manufacturer information, product troubleshooting, user manuals, operating manuals, product manuals, independent product research, etc. The further information may be found at the local domain, at the partner entity's web page, as the result of an internet search, etc.

Additionally, in another embodiment, the transaction may include introducing the user to a group and/or registering the user as a member of the group. In one embodiment, the group may include an online forum. In another embodiment, the group may include a group of individuals with similar product interests and/or intents. In this way, the user may be able to further interact with the group, e.g. exchange knowledge and information about the selected products with one or more members of the group, etc.

In yet another embodiment, the user may be registered as the member of the group in order to receive discounts on future purchases through one or more vendors. For example, if the user clicks on an icon with the intent of purchasing one or more selected products, and group buys exist for one or more selected products, the user may be asked whether they are interested in participating in the group buy.

Further, in another embodiment, the transaction may include outputting a bid from a vendor directed to the user. The bid may include any offer to sell the product by the vendor. In one embodiment, the bid may be output upon selection of the product by the user. For example, upon selection of one or more of the products, manufacturers of the products may send bids for the sale of one or more of the products to the user. In another embodiment, the bid may be output upon the estimation of the user's interest in the product. For example, upon selection of one or more products by the user, an indication of the user's interest in the products may be sent to the manufacturer of the products. In yet another embodiment, the user may determine whether to receive bids for the sale of the selected products in addition to/instead of directly purchasing the selected products.

In another embodiment, the transaction may include outputting a purchase bid from a user directed toward one or more vendors. For example, the purchase bid may include an offer to purchase one or more products at a price determined by the user. In another example, the user may select one or more items of real estate, and may submit bids for the purchase of the selected real estate. In yet another example, the user may select one or more auction items, and may submit bids for the purchase of the selected auction items.

In yet another embodiment, the transaction may include a transaction where the user inputs are recorded. For example, the user inputs may be recorded for future reference. In another example, the user inputs may be recorded for product purchase decision making. In yet another example, the user inputs may be recorded for additional actions leading to other transactions. In still another example, the user inputs may be recorded for future advertising and product supply planning. In this way, the user inputs may be used for future marketing research as well as for improving the future transaction experiences of the user.

In still another embodiment, the transaction may include connecting the user to services associated with the selected product or products. For example, if the user selects an appliance from the output data, the user may be connected to a local appliance installer or if a user selects a television satellite receiver or a cellular phone, the user may be connected to the subscription fees from the service providers associated with it. In another example, the user may be connected to a warranty provider or further support services such as but not limited to repair, maintenance, etc., for the selected product or products. In still yet another embodiment, the transaction may include use of prior user inputs to change or refer current user inputs.

Use Cases

Figure 12:
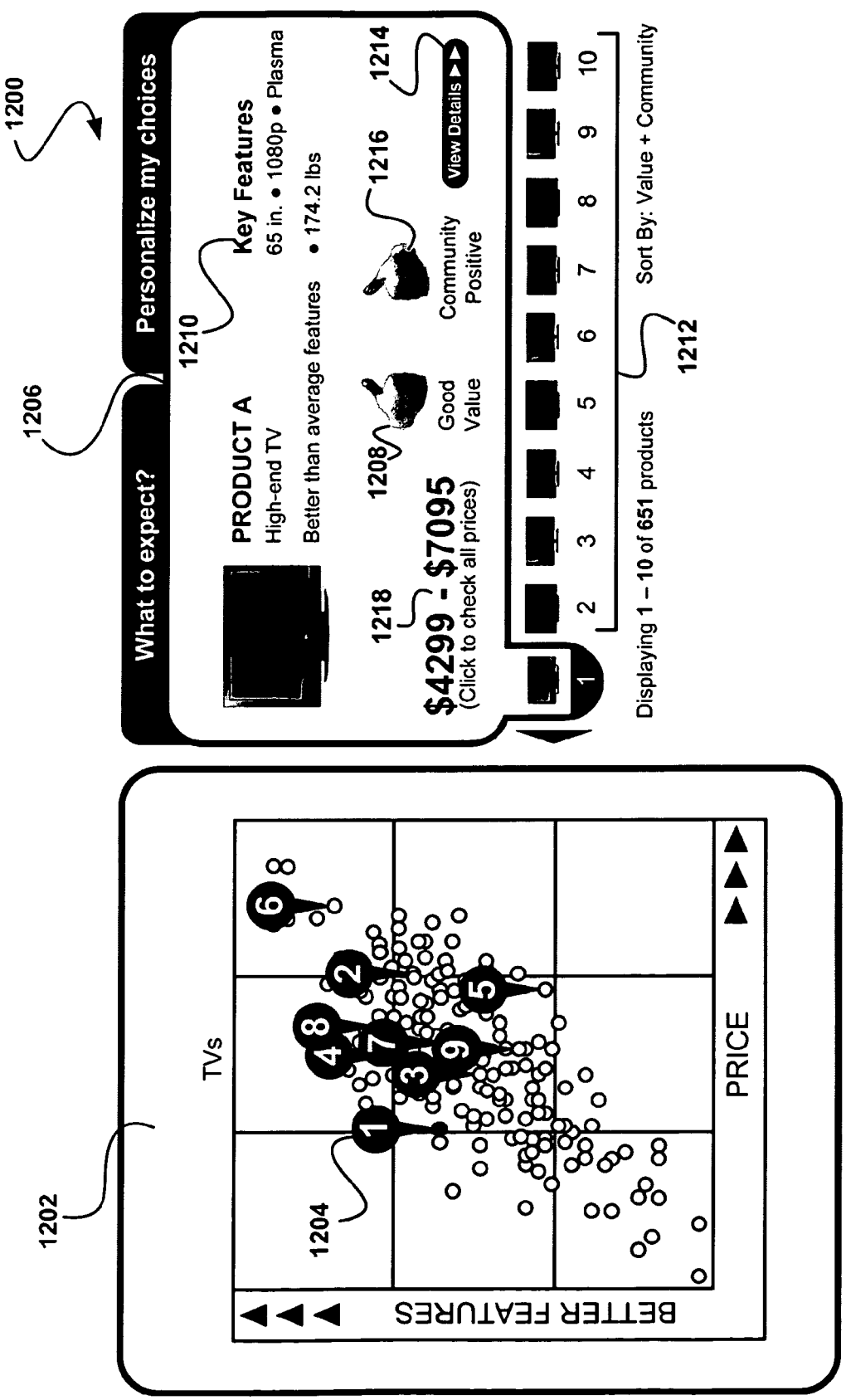
FIG. 12 shows an illustrative graphical presentation, in accordance with still yet another embodiment.

FIG. 12 shows an illustrative graphical presentation 1200, in accordance with yet another embodiment. As an option, the graphical presentation 1200 may be carried out in the context of the architecture and environment of FIGS. 1-11. Of course, however, the graphical presentation 1200 may be carried out in any desired environment.

As shown, a multidimensional graphical presentation 1202 is provided. The graphical presentation 1202 plots products according to features and prices of the products. Upon selecting one of the products 1204, additional information 1206 is provided. Such information includes key features 1210 of the product, a value rating 1208 and a community rating 1216, a price range 1218 for the product, and a listing of additional products 1212 for purposes of comparison. Additional details are available for the product 1204 by selecting details button 1214.

Figure 13:
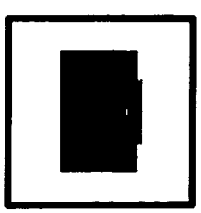
FIG. 13 shows illustrative output data, in accordance with still another embodiment.

FIG. 13 shows illustrative output data 1300, in accordance with still another embodiment. As an option, the method 1300 may be carried out in the context of the architecture and environment of FIGS. 1-12. Of course, however, the illustrative output data 1300 may be carried out in any desired environment.

In one embodiment, Output data 1300 may be presented upon a user clicking on the details button 1214 shown in FIG. 12. In addition to providing additional images 1302 of the selected product, the output data 1300 further includes a more detailed description 1304 of the product, in addition to providing summaries of stores 1306A-C that sell the product.

As shown, the summaries of stores 1306A-C include store reviews 1308A-C as well as the prices 1310A-C at which the stores 1306A-C are selling the product. Additionally, links 1312A-C are provided to enable the purchase of the product from the stores 1306A-C.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using, a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   generating, using a processor, output data corresponding to a multidimensional graphical presentation of at least two dimensions, where each dimension represents values of attributes of products, wherein no dimension is a side by side ordering of the products, wherein a representation of each of one or more products is placed in the graphical presentation independently according to attribute values of the one or more products;
   receiving a user selection of one or more of the products;
   generating output data corresponding to additional information for presentment to the user based on the selection of the one or more of the products;
   receiving additional input from the user corresponding to user-selection of a portion of the additional information; and
   performing a transaction based on the additional input received from the user,
   wherein additional visual dimensions are displayed on the multidimensional graphical presentation of at least two dimensions;
   the transaction further comprising:
   registering the user to receive additional information about the one or more of the products;
   outputting a bid from a vendor directed to the user;
   connecting the user to services associated with the selected one or more of the products; and
   using prior user inputs to change or refer current user inputs.

2. A method as recited in claim 1, wherein the attributes include at least two of prices of the products, features of the products, manufacturers of the products, brands associated with the products, additional add-ons associated with the products, a seller of the products, a rating of the products based on experts or users, a quantitative representation of user interest in the products, market buzz associated with the products, a cost of ownership of the products, a green index of the products, an energy index of the products, a popularity of the products, a fashion/style index of the products, a recency index of the products, reliability index, services associated with the products, product price history and combinations thereof.

3. A method as recited in claim 2, wherein the attributes, or derivatives thereof, are mapped against each other for each product to generate the output data corresponding to the multidimensional presentation.

4. A method as recited in claim 1, wherein the multidimensional presentation is two dimensional.

5. A method as recited in claim 1, wherein the multidimensional presentation is three dimensional.

6. A method as recited in claim 5, wherein additional visual dimensions are displayed on the three dimensional presentation.

7. A method as recited in claim 1, wherein the multidimensional presentation includes a group of multidimensional sub-presentations, the sub-presentations in the group having a common dimension.

8. A method as recited in claim 1, wherein the user selection is based on receiving user-selection of one of the representations of the products directly from the multidimensional presentation output to the user on a display.

9. A method as recited in claim 1, wherein the transaction is a monetary transaction for purchase of the one or more selected products.

10. A method as recited in claim 9, wherein the additional information includes either a local page facilitating purchase of the one or more selected products, or a third party page facilitating purchase of the one or more selected products.

11. A method as recited in claim 1, wherein the additional information includes access to research information relating to the selected one or more of the products, wherein the transaction includes retrieving research information in response to the additional input from the user and outputting the retrieved research information.

12. A method as recited in claim 1, wherein the transaction includes registering the user to receive additional information about the one or more of the products.

13. A method as recited in claim 1, wherein the transaction includes leading the user to a promotion or campaign.

14. A method as recited in claim 1, wherein the transaction includes generating output corresponding to further information selected from a group consisting of: expert reviews, user reviews, expert ratings, user ratings, user generated content, product troubleshooting, user manuals, operating manuals, and product manuals.

15. A method as recited in claim 1, wherein the transaction includes registering the user as a member of a group.

16. A method as recited in claim 1, wherein the transaction includes outputting a bid from a vendor directed to the user.

17. A method as recited in claim 1, wherein the transaction includes a transaction where the user inputs are recorded for at least one of: future reference, product purchase decision making, and additional actions leading to other transactions.

18. A method as recited in claim 1, wherein the transaction includes connecting the user to services associated with the selected one or more of the products.

19. A method as recited in claim 1, wherein the transaction includes use of prior user inputs to change or refer current user inputs.

20. A method, comprising:
   generating, using a processor, output data corresponding to a multidimensional presentation of graphical representations of two or more consumer products in relation to each other, positions of the graphical representations of the consumer products relative to each other being based on multiple attributes of the products, where none of the dimensions correlates to a side by side ordering of the consumer products;
   receiving a user selection of one or more of the consumer products; and
   performing a transaction based on additional input received from the user, wherein the transaction includes generating output corresponding to further information selected from a group consisting of: expert reviews, user reviews, expert ratings, user ratings, user generated content, product troubleshooting, user manuals, operating manuals, and product manuals;
the transaction further comprising:
registering the user to receive additional information about the one or more of the products;
outputting a bid from a vendor directed to the user;
connecting the user to services associated with the selected one or more of the products: and
using prior user inputs to change or refer current user inputs,
wherein the boundaries of the graphical representation of each of one or more groups of products are based on aggregated attribute values of at least some products in the one or more groups of products.

21. A method, comprising:
generating, using a processor, output data corresponding to a multidimensional graphical presentation of at least two dimensions, where each dimension represents values of attributes of products, wherein no dimension is a side by side ordering of the products, wherein a representation of each of one or more groups of products is placed in the graphical presentation independently according to attribute values of the products in the one or more groups;
receiving a user selection of one or more of the product groups;
performing a transaction based on additional input received from the user;
the transaction further comprising:
registering the user to receive additional information about the one or more of the products;
outputting a bid from a vendor directed to the user;
connecting the user to services associated with the selected one or more of the products; and
using prior user inputs to change or refer current user inputs.

22. A method as recited in claim 21, wherein boundaries of the graphical representation of each of the one or more groups of products are based on aggregated attribute values of at least some products in the group.

23. A system, comprising:
a processor configured to generate output data corresponding to a multidimensional graphical presentation of at least two dimensions, where each dimension represents values of attributes of products, wherein no dimension is a side by side ordering of the products, wherein a representation of each of one or more products is placed in the graphical presentation independently according to attribute values of the one or more products;
logic for receiving a user selection of one or more of the products;
logic for generating output data corresponding to additional information for presentment to the user based on the selection of the one or more of the products;
logic for receiving additional input from the user corresponding to user-selection of a portion of the additional information; and
logic for performing a transaction based on the additional input received from the user,
wherein additional visual dimensions are displayed on the multidimensional graphical presentation of at least two dimensions;
the transaction further comprising:
registering the user to receive additional information about the one or more of the products;
outputting a bid from a vendor directed to the user;
connecting the user to services associated with the selected one or more of the products; and
using prior user inputs to change or refer current user inputs.

24. A system, comprising:
a processor configured to generate output data corresponding to a multidimensional presentation of graphical representations of two or more consumer products in relation to each other, positions of the graphical representations of the consumer products relative to each other being based on multiple attributes of the products, where none of the dimensions correlates to a side by side ordering of the consumer products;
logic for receiving a user selection of one or more of the consumer products; and
logic for performing a transaction based on additional input received from the user, wherein the transaction includes generating output corresponding to further information selected from a group consisting of: expert reviews, user reviews, expert ratings, user ratings, user generated content, product troubleshooting, user manuals, operating manuals, and product manuals;
the transaction further comprising:
registering the user to receive additional information about the one or more of the products;
outputting a bid from a vendor directed to the user;
connecting the user to services associated with the selected one or more of the products; and
using prior user inputs to change or refer current user inputs,
wherein the boundaries of the graphical representation of each of one or more groups of products are based on aggregated attribute values of at least some products in the one or more groups of products.

25. A system, comprising:
a processor configured to generate output data corresponding to a multidimensional graphical presentation of at least two dimensions, where each dimension represents values of attributes of products, wherein no dimension is a side by side ordering of the products, wherein a representation of each of one or more groups of products is placed in the graphical presentation independently according to attribute values of the products in the one or more groups;
logic for receiving a user selection of one or more of the product groups;
logic for performing a transaction based on additional input received from the user;
the transaction further comprising:
registering the user to receive additional information about the one or more of the products;
outputting a bid from a vendor directed to the user;
connecting the user to services associated with the selected one or more of the products; and
using prior user inputs to change or refer current user inputs.

26. A computer program product embodied on a non-volatile computer readable medium having computer code thereon, the computer code comprising:
computer code for generating output data corresponding to a multidimensional graphical presentation of at least two dimensions, where each dimension represents values of attributes of products, wherein no dimension is a side by side ordering of the products, wherein a representation of each of one or more products is placed in the graphical presentation independently according to attribute values of the one or more products;

computer code for receiving a user selection of one or more of the products;

computer code for generating output data corresponding to additional information for presentment to the user based on the selection of the one or more of the products;

computer code for receiving additional input from the user corresponding to user-selection of a portion of the additional information; and computer code for performing a transaction based on the additional input received from the user, wherein additional visual dimensions are displayed on the multidimensional graphical presentation of at least two dimensions;

the transaction further comprising:

registering the user to receive additional information about the one or more of the products;

outputting a bid from a vendor directed to the user;

connecting the user to services associated with the selected one or more of the products; and using prior user inputs to change or refer current user inputs.

27. A computer program product embodied on a non-volatile computer readable medium having computer code thereon, the computer code comprising:

computer code for generating output data corresponding to a multidimensional presentation of graphical representations of two or more consumer products in relation to each other, positions of the graphical representations of the consumer products relative to each other being based on multiple attributes of the products, where none of the dimensions correlates to a side by side ordering of the consumer products;

computer code for receiving a user selection of one or more of the consumer products; and computer code for performing a transaction based on additional input received from the user, wherein the transaction includes generating output corresponding to further information selected from a group consisting of: expert reviews, user reviews, expert ratings, user ratings, user generated content, product troubleshooting, user manuals, operating manuals, and product manuals;

the transaction further comprising:

registering the user to receive additional information about the one or more of the products;

outputting a bid from a vendor directed to the user;

connecting the user to services associated with the selected one or more of the products; and using prior user inputs to change or refer current user inputs, wherein the boundaries of the graphical representation of each of one or more groups of products are based on aggregated attribute values of at least some products in the one or more groups of products.

28. A computer program product embodied on a non-volatile computer readable medium having computer code thereon, the computer code comprising:

computer code for generating output data corresponding to a multidimensional graphical presentation of at least two dimensions, where each dimension represents values of attributes of products, wherein no dimension is a side by side ordering of the products, wherein a representation of each of one or more groups of products is placed in the graphical presentation independently according to attribute values of the products in the one or more of the products groups;

computer code for receiving a user selection of one or more of the product groups;

computer code for performing a transaction based on additional input received from the user;

the transaction further comprising:

registering the user to receive additional information about the one or more of the products;

outputting a bid from a vendor directed to the user;

connecting the user to services associated with the selected one or more of the products; and using prior user inputs to change or refer current user inputs.

* * * * *

UNITED STATES PATENT AND TRADEMARK OFFICE
CERTIFICATE OF CORRECTION

| | | |
|---|---|---|
| PATENT NO. | : 8,165,925 B2 | Page 1 of 1 |
| APPLICATION NO. | : 12/062393 | |
| DATED | : April 24, 2012 | |
| INVENTOR(S) | : Vailaya et al. | |

It is certified that error appears in the above-identified patent and that said Letters Patent is hereby corrected as shown below:

In the specification:

col. 5, line 18, replace "in" with --In--;

col. 6, line 57, replace "in" with --In--;

col. 10, line 10, replace "Output" with --output--.

Signed and Sealed this
Fourteenth Day of August, 2012

David J. Kappos
*Director of the United States Patent and Trademark Office*